Dec. 8, 1959   G. PIÉMONT   2,916,130
CONVEYORS
Filed Nov. 13, 1957   4 Sheets-Sheet 1
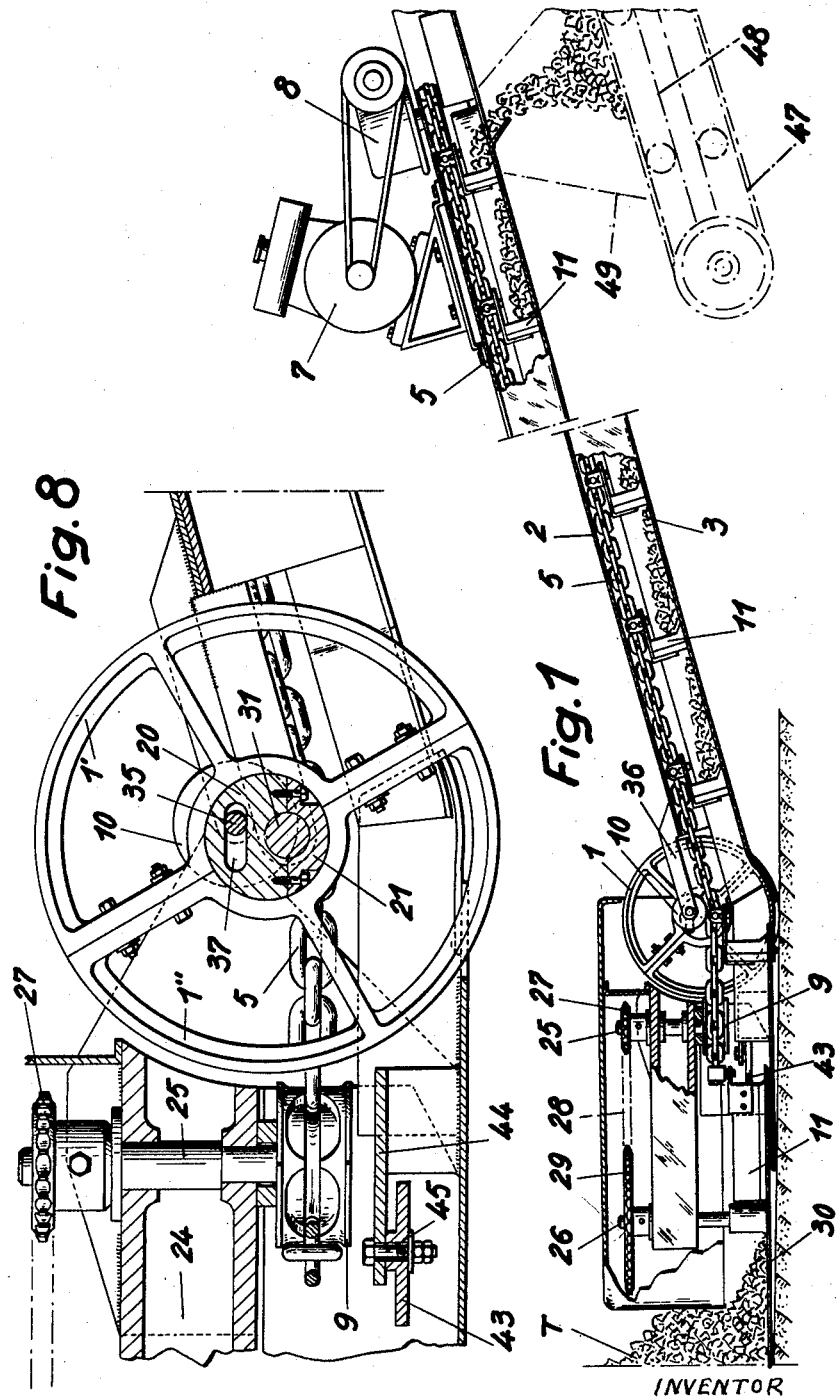
INVENTOR
GEORGES PIEMONT
By Linton and Linton
ATTORNEYS Dec. 8, 1959  G. PIEMONT  2,916,130
CONVEYORS
Filed Nov. 13, 1957  4 Sheets-Sheet 2
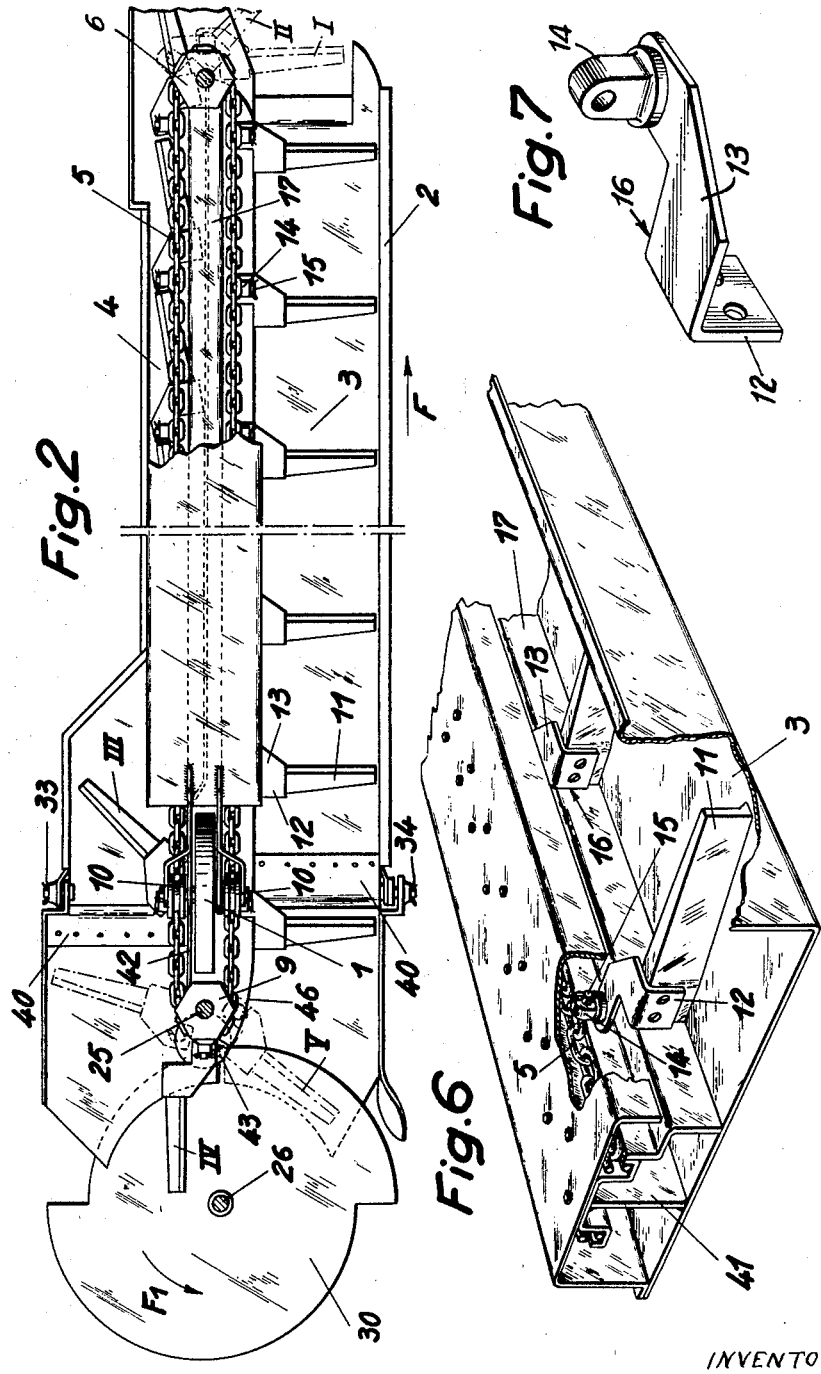
INVENTOR
GEORGES PIEMONT
By Linton and Linton
ATTORNEYS Dec. 8, 1959   G. PIEMONT   2,916,130
CONVEYORS
Filed Nov. 13, 1957   4 Sheets-Sheet 3
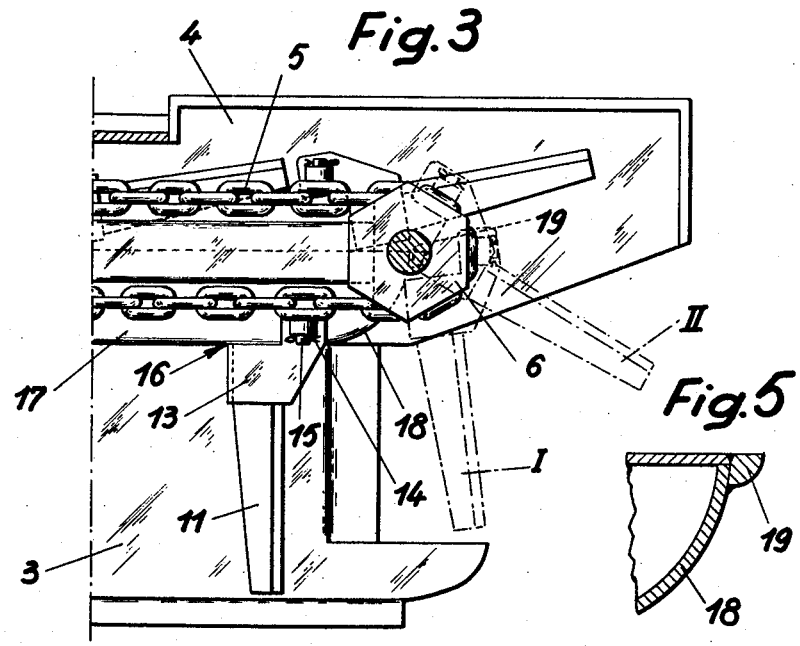
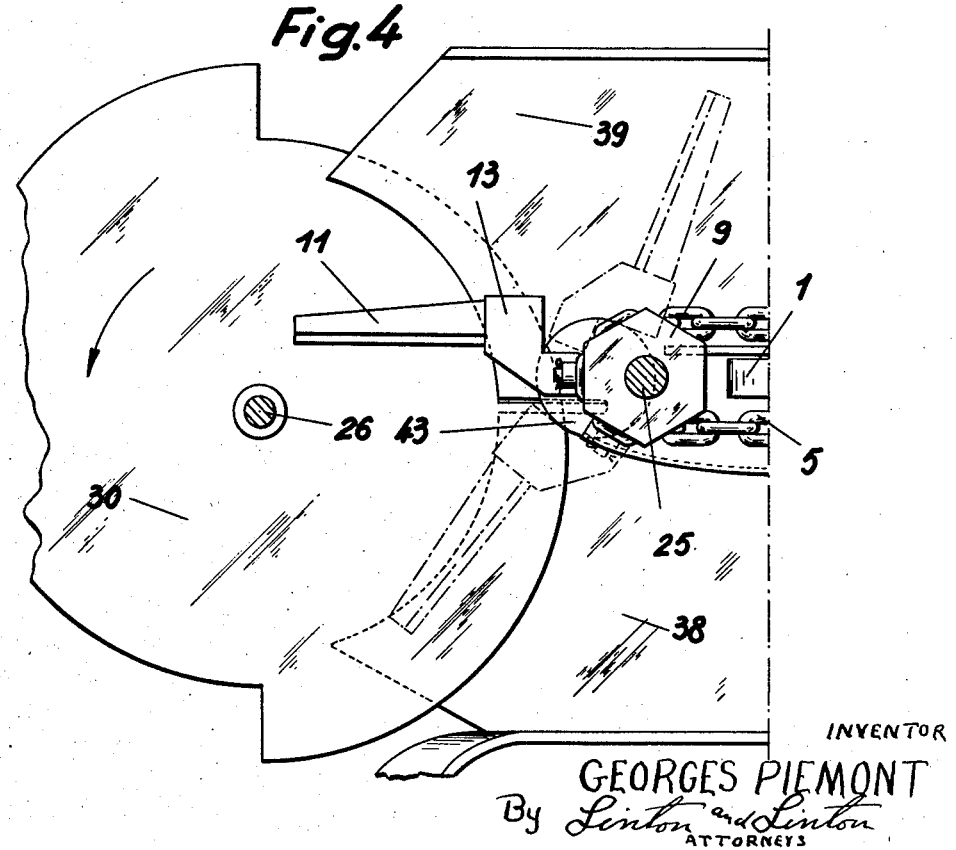
INVENTOR
GEORGES PIEMONT
By Linton and Linton
ATTORNEYS Dec. 8, 1959   G. PIEMONT   2,916,130
CONVEYORS Filed Nov. 13, 1957   4 Sheets-Sheet 4

INVENTOR
GEORGES PIEMONT
By Linton and Linton
ATTORNEYS

United States Patent Office 2,916,130
Patented Dec. 8, 1959

2,916,130

CONVEYORS

Georges Piemont, Vanves, France

Application November 13, 1957, Serial No. 696,206

Claims priority, application France December 14, 1956

5 Claims. (Cl. 198—7)

Conveyors are already known, comprising a stationary conveyor belt along which move from one end to the other transverse scraper elements of metal, forming between themselves compartments in the manner of pockets that are loaded manually or mechanically at one of said ends, the materials thus loaded on the conveyor being pushed by said elements and caused to slide along the conveyor track at the other end whereof they are discharged.

In such conveyors the scraper elements are driven, for instance by means of endless chains, so as to move in two parallel planes, in one of which the conveyance of the materials is effected whereas in the other plane the scraper elements return empty. The result is a conveyor of considerable width.

There are also machines known as plate scrapers, consisting essentially of a disc of large diameter, rotated by any suitable means, which is directly forced into a pile of loose material that is to be conveyed in such a manner that its diameter perpendicular to the direction of entry into the pile is horizontal, resulting in some of said material being carried by the rotating disc to a position where it is transferred to a conveyor belt or to a scraper conveyor of the kind briefly described above.

In view of the width or depth of said conveyor band or conveyor, the plate scraper disc has to be considerably inclined forwards. By virtue thereof, the material picked up can slide on the disc, and only a small proportion thereof can be discharged on to the conveyor belt or scraper conveyor, unless the disc is equipped with radial or other grooves. In additon, the considerable forward inclination with reference to the line of advance produces a great resistance to the penetration of the disc, since the latter has to exert the action of a wedge.

An object of the present invention is to remedy these disadvantages.

To the attainment of this object the invention is particularly characterised by the combination of a smooth scraper disc working flat on the ground and a scraper conveyor the scraper elements whereof occupy reduced space while moving during their idle return motion in the same plane as during their conveying stroke.

As the scraper conveyor has to be able to take up a suitable inclination independently of the plate scraper, these two assemblies are connected by a hinge joint and supported by a wheel.

Each scraper element is fixed in a particular manner by one of its ends to an endless chain running over two sprocket wheels, one of which drives the chain while the other actuates the disc of the plate scraper through the intermediary of suitable gearing.

Each scraper element is attached to a link of the conveyor chain by means of an element hinged on two perpendicular pins and acting by means of one of these hinges in conjunction with a central, longitudinal rail, to hold each such scraper element in a position perpendicular to the direction of advance during conveyance of the material and to enable each such scraper element to fold backwards against the follower part of the chain during the return motion thereof. In addition, by means of a second hinge, said hinged element allows the scraper elements to lie flat on the disc of the plate scraper whatever the slope of the scraper conveyor.

The foregoing and other features of the invention will be fully understood from the following description aided by reference to the accompanying drawings which show some embodiments by way of example.

Fig. 1 is an elevation of the machine partly in section;

Fig. 2 is a plan partly in section and with omission of the mechanism driving the plate scraper;

Figs. 3 and 4 are partial plan views, on a larger scale, respectively corresponding to Fig. 1 and Fig. 2 and showing the two ends of the machine;

Fig. 5 shows on a larger scale a further detail of Fig. 3;

Fig. 6 is a perspective view of part of the scraper conveyor;

Fig. 7 shows separately in perspective one of the hinged elements attaching the scraper elements to the conveyor chain;

Fig. 8 is a longitudinal section on a still larger scale, showing the hinging of the two principal assemblies of the machine;

Figure 9:
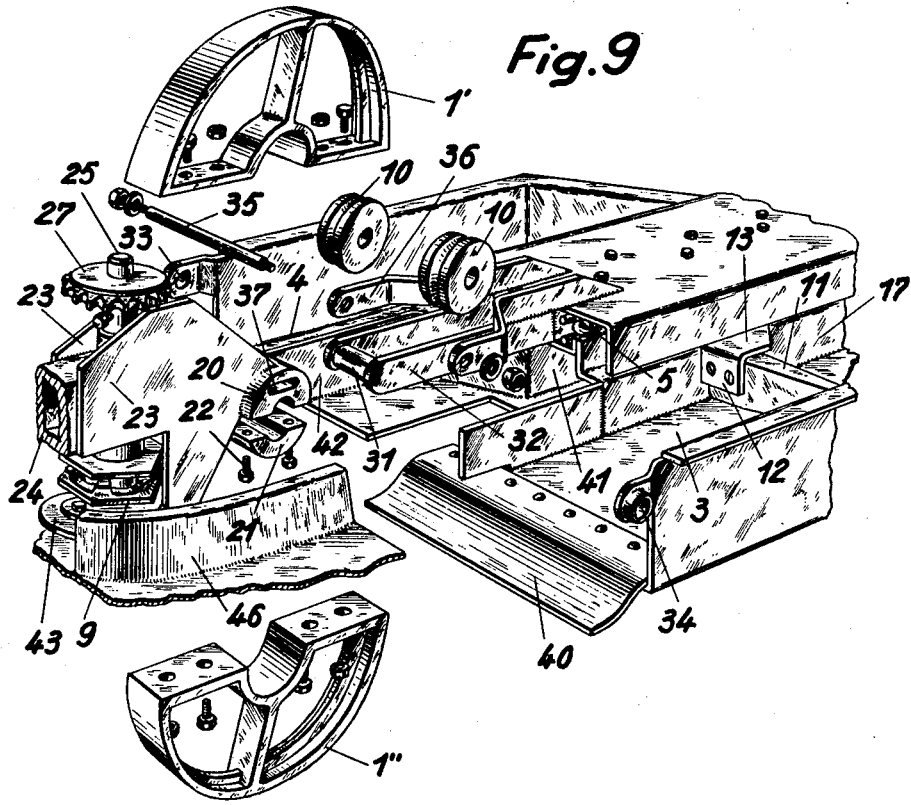
Fig. 9 is an exploded perspective view of Fig. 8.

The illustrated machine comprises a scraper conveyor assembly, and a plate scraper assembly hinged together (as will presently be explained) and supported by a wheel 1.

The scraper conveyor assembly, which is hinged at one end near the middle of the carrying wheel 1, comprises a jib or outrigger 2 essentially for supporting a conveyor track 3 and a return track 4. These two tracks, which are arranged in the same plane, are situated on opposite sides of an endless chain 5 which on the one hand runs over a driving sprocket wheel 6 receiving its drive from a motor or engine 7 through the intermediary of a speed-reducing gear 8, and on the other hand over a sprocket wheel 9. Between the two sprocket wheels 6 and 9, the two parts of said chain are guided by jockey rollers 10.

The chain 5 carries regularly-spaced scraper elements 11 fitted so as to extend across the conveyor track 3. Each scraper element, made for instance of hard rubber, is attached to a metal fitting 12 in the form of an angle iron, the limb 13 whereof, parallel to the track 3, is hinged to a lug 14 which itself pivots on a pin 15 carrying one link of the chain 5. It will be appreciated that the first hinge enables the scraper element to move over the conveyor track 3 without losing contact therewith; the purpose of the second hinge will be revealed presently.

While in the working position (arrow F, Fig. 2), the scraper elements 11 are maintained perpendicular to their direction of advance by the shoulders 16 of their fittings 12 bearing against a central rail 17. This rail merges into a circular arc 18 terminating at the centre of the chain sprocket wheel 6.

When a scraper element 11 arrives at the discharging end of the track 3 the material conveyed by it along said track 3 is dropped, and said element, actuated by the chain 5, continues to move forward; but while the first hinge joint travels along a fixed path identical with that of the chain, the shoulder 16 of the fitting 12 bears on the curved end 18 of the rail 17 with the result that the free end of the scraper element is retarded in its rotation and reaches, for instance, the position I (Figs. 2 and 3) remaining there until the shoulder 16 of the fitting 12 abuts against a stop 19 (Fig. 5) forming the end of the circular arc 18. The chain 5 remaining in motion, the scraper element 11 then reaches the position II which it keeps until the shoulder 16 of the fitting 12 clears the point of the stop 19, when the element becomes completely folded back on the return track 4.

Aforesaid wheel 1, which is in two detachable halves 1' and 1" (Figs. 8 and 9), runs freely on a split hub 20 and 21 held together by bolts 22. Hub part 20 carries laterally welded gussets 23 continuing in the form of a box frame 24 which carries two parallel, vertical shafts 25 and 26, the shaft 25 having fixed on its lower end the chain sprocket wheel 9 already mentioned, and on its upper end a chain sprocket wheel 27 connected by a chain 28 to another sprocket wheel 29 keyed on the shaft 26; this shaft 26 drives a plate scraper disc 30 that rests on the ground.

The split hub 20 and 21 is fitted on a journal 31 integral with two stirrup irons 32 welded on the front part of the jib or outrigger 2 (Figs. 8 and 9). Consequently this jib 2 swings about said journal 31 causing the scraper disc 30 to rest on the ground. This central hinge of the jib is reinforced by two side hinges 33 and 34.

Guide or jockey rollers for the chain 5 ride idly on a pin 35 held in stirrups 36 welded on the jib 2. As the pin 35 has to pass through the part 20 of the hub, this part has for this purpose an elongated hole 37 which allows the pin 35 to move freely when the inclination of the jib 2 is being changed. However, the eccentricity of the jockey roller axis with reference to the hinge-pin or journal 31 of the jib enables, for a suitable diameter of said rollers, the avoidance in some degree of changes in the inclination of the jib, influencing the length of the conveyor chain.

The plate scraper assembly includes a transporting track 38 and an idling return track 39, corresponding to the tracks 3 and 4 of the conveyor assembly. Discontinuities between these tracks are bridges by means of sheet metal flaps 40 fitted above and below said tracks in the direction of motion of the scraper elements 11. In addition, the front ends of the tracks 38 and 39 are arranged, the one over and the other under, the disc 30 of the plate scraper.

It has already been explained that on the return track, the scraper elements 11 are folded backwards in order to reduce the bulk (width) of the conveyor. During this return motion, the shoulders 16 of the fittings 12 on the scraper elements 11 slide freely over a partition 41 arranged longitudinally between the two parts of the chain 5. Near and in front of the wheel 1, this partition 41 is deflected, at 42, towards the folded scraper elements; as a result, any element moving on to this deflected section 42 is caused to pivot forwards (position III, Fig. 2). The end of aforesaid deflected section 42 extends as far as a disc 43 mounted on a support 44 (Fig. 8) and rotating freely on a pivot 45 in such a manner that when the shoulder 16 of the fitting 12 on a scraper element 11 moves off the said end, it passes on to the disc 43 which completes the movement of the element (position IV, Fig. 2), the latter thus being brought into the correct position for picking up the material brought in front of it by the disc 30 during its rotation in the direction of the arrow $F_1$.

As soon as each element 11 starts its conveying action along the track 3, its shoulder 16 moves off the disc 43 and passes on to a central rail 46 forming a prolongation of the rail 17 of the conveyor (position V, Fig. 2).

The disc 30 is in fact formed of two semi-circles, identically-oppositely staggered with reference to the axis of rotation 26 in such a manner that when said disc is rotating in the direction of the arrow $F_1$, Fig. 2, two scraper strokes are made for each rotation, with progressive penetration over an arc of 180°, of the disc into the piled or heaped material to be conveyed. In addition, this eccentric arrangement facilitates the forward feed of the machine into the pile of material, by the smaller diameter of the scraper disc.

The advance of the machine with progressive removal of the material from the pile may be performed in any suitable manner, either manually or mechanically.

If the scraper conveyor described is required to deliver the material to a belt conveyor 47 (Fig. 1) itself in an inclined position, the upper part of said scraper conveyor may with advantage be made to rest on side rails 48 of said belt conveyor by means of a carriage 49 running by gravity on said rails, in order to enable the scraper conveyor to be advanced in the direction of the pile T of the material to be conveyed.

Figure 10:
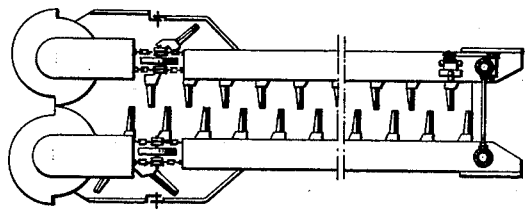
Fig. 10 is a plan on a smaller scale of an alternative form or embodiment.
Figure 11:
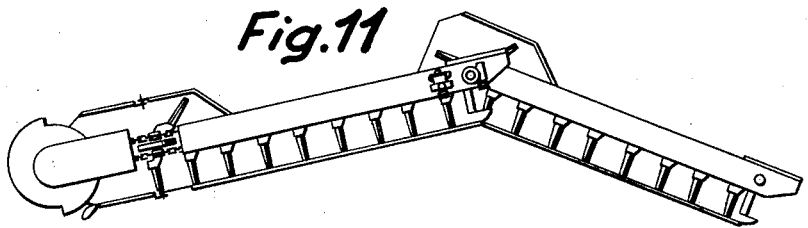
Fig. 11 is similarly a plan on a smaller scale, showing a machine arranged for conveying materials along a non-rectilinear path.

The invention obviously covers many alternative forms. Thus it is possible to make a twin or duplex arrangement of two machines as described, side by side (Fig. 10). It is also possible to use in combination with a scraper conveyor according to the invention, one or more further conveyors hinged to each other, the chain of the second conveyor being operated by the driving wheel of the chain of the first conveyor and so forth in order to be able to convey material along a non-rectilinear path (Fig. 11). In all such cases, the length of the conveyor or the number of scraper elements may be varied within wide limits, and in some cases the conveyor may even be made very short and its action limited to discharging the material picked up by the disc 30 on to a conveyor belt arranged near the ground. Further, in all such cases the conveyor track can incorporate flaps or trap-doors distributed along its length, for changing the point of discharge.

I claim:

1. A combination scraper and conveyor comprising an elongated jib providing a conveyor track and return track, a driven sprocket wheel rotatably mounted at one end of said jib between said tracks, a second sprocket wheel, a flexible endless chain extending around and between said sprocket wheels in meshed engagement therewith, a series of scraper elements connected along the length of said chain for being drawn thereby over said tracks, supporting means pivotally connected to the other end of said jib for upward and downward movement relative thereto and having said second sprocket wheel rotatably mounted thereon, a second pair of sprocket wheels rotatably mounted on said supporting means with one sprocket wheel being in driving connection with said second sprocket wheel, an endless chain extending around and between said second pair of sprocket wheels in meshed engagement therewith, a scraping disk rotatably supported by said supporting means and connected to the other sprocket of said second pair of sprockets for being rotated thereby, and a ground wheel positioned between said first mentioned chain adjacent said second sprocket wheel and rotatably supported by said supporting means at its pivotal connection to said jib.

2. A combination scraper and conveyor as claimed in claim 1 wherein said scraping disk has the configuration of a pair of joined semi-circular offset disks providing a pair of semi-circular edges therefore of progressively greater diameter for progressively biting into piled material twice with each rotation of said scraping disk to facilitate the removal of said material.

3. A combination scraper and conveyor as claimed in claim 1 wherein a second pair of tracks are carried by said supporting means below said second sprocket wheel and positioned as a continuation of said conveyor track and return track, said second pair of tracks being spaced apart and one above the other with a portion of said scraping disk positioned for moving over the lowermost of said second pair of tracks and under the uppermost thereof with said scraper elements moving over said second pair of tracks and said scraping disk portion.

4. A combination scraper and conveyor as claimed in claim 1 wherein a pair of rollers are rotatably supported by said jib adjacent its pivotal connection to said supporting means and each positioned with said first mentioned chain running thereunder whereby said rollers maintain said first mentioned chain under tension at all times regardless of changes in the relative positions of said jib and said supporting means.

5. A combination scraper and conveyor as claimed in claim 1 wherein said supporting means include a journal fixedly supported by said jib, a hub rotatably mounted on said journal and having said wheel rotatably mounted thereon, gussets extending from said hub, a pair of shafts rotatably mounted on said gussets with one shaft having said second sprocket wheel and one sprocket wheel of said second pair of sprocket wheels fixedly mounted thereon and the other shaft having the other sprocket wheel of said second pair of sprocket wheels and said scraping disk fixedly mounted thereon.

References Cited in the file of this patent

UNITED STATES PATENTS

| | | |
|---|---|---|
| 1,290,200 | Holmested | Jan. 7, 1919 |
| 1,671,950 | Necheff | May 29, 1928 |
| 2,773,584 | Densmore | Dec. 11, 1956 |